United States Patent
Ishikawa

(10) Patent No.: US 7,873,423 B2
(45) Date of Patent: Jan. 18, 2011

(54) SYSTEM AND METHOD FOR DISTRIBUTING AND TRACKING MEDIA

(75) Inventor: Mark M. Ishikawa, Los Gatos, CA (US)

(73) Assignee: BayTSP.com, Inc., Los Gatos, CA (US)

( * ) Notice: Subject to any disclaimer, the term of this patent is extended or adjusted under 35 U.S.C. 154(b) by 461 days.

(21) Appl. No.: 11/396,233

(22) Filed: Mar. 31, 2006

(65) Prior Publication Data

US 2007/0239840 A1    Oct. 11, 2007

Related U.S. Application Data

(60) Provisional application No. 60/667,721, filed on Apr. 1, 2005.

(51) Int. Cl.
*G06F 19/00* (2006.01)

(52) U.S. Cl. .......................................... 700/56; 709/210

(58) Field of Classification Search .................. 700/56, 700/58, 90, 233, 231, 241; 701/207; 34/539.18, 34/538.1, 538.13, 10.1, 425.5; 702/188, 702/185; 709/210; 726/3; 455/422.1, 472.2; 340/572.1, 539.13, 539.16, 539.17

See application file for complete search history.

(56) References Cited

U.S. PATENT DOCUMENTS

| | | | | |
|---|---|---|---|---|
| 6,002,646 | A * | 12/1999 | Reid et al. | 367/149 |
| 6,088,451 | A | 7/2000 | He et al. | 380/25 |
| 6,115,817 | A | 9/2000 | Whitmire | 713/171 |
| 6,137,782 | A | 10/2000 | Sharon et al. | 370/255 |
| 6,356,842 | B1 | 3/2002 | Intriligator et al. | 702/3 |
| 6,606,556 | B2 | 8/2003 | Curatolo et al. | 701/207 |
| 6,832,318 | B1 * | 12/2004 | Yaegashi et al. | 713/193 |
| 6,975,224 | B2 * | 12/2005 | Galley et al. | 340/539.18 |
| 7,394,361 | B1 * | 7/2008 | Twitchell, Jr. | 340/539.1 |
| 2004/0124977 | A1 | 7/2004 | Biffar | 340/539 |
| 2004/0183671 | A1 * | 9/2004 | Long | 340/539.1 |
| 2004/0183673 | A1 * | 9/2004 | Nageli | 340/539.13 |
| 2004/0254676 | A1 * | 12/2004 | Blust et al. | 700/231 |
| 2005/0073406 | A1 * | 4/2005 | Easley et al. | 340/539.1 |
| 2006/0164232 | A1 * | 7/2006 | Waterhouse et al. | 340/506 |
| 2007/0095905 | A1 * | 5/2007 | Kadaba | 235/384 |

OTHER PUBLICATIONS

MediaSentinel Deters Privacy of Valuable Digital Video Assets.

(Continued)

*Primary Examiner*—Kidest Bahta
(74) *Attorney, Agent, or Firm*—Osama Hussain, Esq.

(57) ABSTRACT

A system and method for tracking media is disclosed. A tracking device package includes a container for shipping media and a tracker coupled to the container wherein access to the media is monitored electronically by the tracker to enable media access. The tracker can be a combination of a GPS system, for determining the location of the media, and a mobile phone for communicating the location to interested parties. The tracker can verify the location of the container and the length of time that the container has been at a particular site. If anomalies are detected with respect to the location and/or the length of time that a container has been located at a particular site, then the tracker can report this information back to the owner of the media being tracked through a central repository and database system.

40 Claims, 6 Drawing Sheets

OTHER PUBLICATIONS

S-Track: Trace Stolen Content Back to the Pirates: http://cinea.com/s-track.html.

Using GPS to Enhance Data Security: http://www.gpsworld.com/gpsworld/article/articleDetail.jsp?id=57975.

Analysis of Security Vulnerabilities in the Movie Production and Distribution Process: http://lorrie.cranor.org/pubs/drm03-tr.pdf.

International Search Report; Nov. 25, 2007.

* cited by examiner

SYSTEM AND METHOD FOR DISTRIBUTING AND TRACKING MEDIA

CROSS-REFERENCE TO RELATED APPLICATIONS

This application claims priority to a U.S. provisional patent application Ser. No. 60/667,721, filed on Apr. 1, 2005. Priority to the provisional application is expressly claimed, and the disclosure of the provisional application is hereby incorporated herein by reference in its entirety.

BACKGROUND

1. Field

Invention relates to security and tracking of valuable items during shipping, and in particular to a system and method for distributing and tracking media.

2. Related Art

In the film distribution industry, the owner of a feature film records the film onto suitable media, typically a strip of film. The strip of film is loaded onto a metal reel that is suitable for the film to be played back on a film projector. The film reel is placed into a metal container and shipped to the movie theaters that have paid the film owner for the rights to show the film in a movie theater.

However, these prior art techniques do not provide a means for tracking the film media in such a way as to prevent the media from being temporarily removed from an expected shipping route, being used for illicit purposes such as copyright infringement, and then being placed back in the stream of commerce without detection by the owner of the media. What is needed is a way to track media in such away that detours from the expected shipping route and usage of media can be detected remotely.

SUMMARY OF THE PREFERRED EMBODIMENTS

A system and method for tracking media is disclosed. A tracking device package includes a container for shipping media and a tracker coupled to the container wherein access to the media is monitored electronically by the tracker to enable media access. The tracker can be a combination of a GPS system, for determining the location of the media, and a mobile phone for communicating the location to interested parties. The tracker can verify the location of the container and the length of time that the container has been at a particular site. If anomalies are detected with respect to the location and/or the length of time that a container has been located at a particular site, then the tracker can report this information back to the owner of the media being tracked through a central repository and database system.

Figure 1:
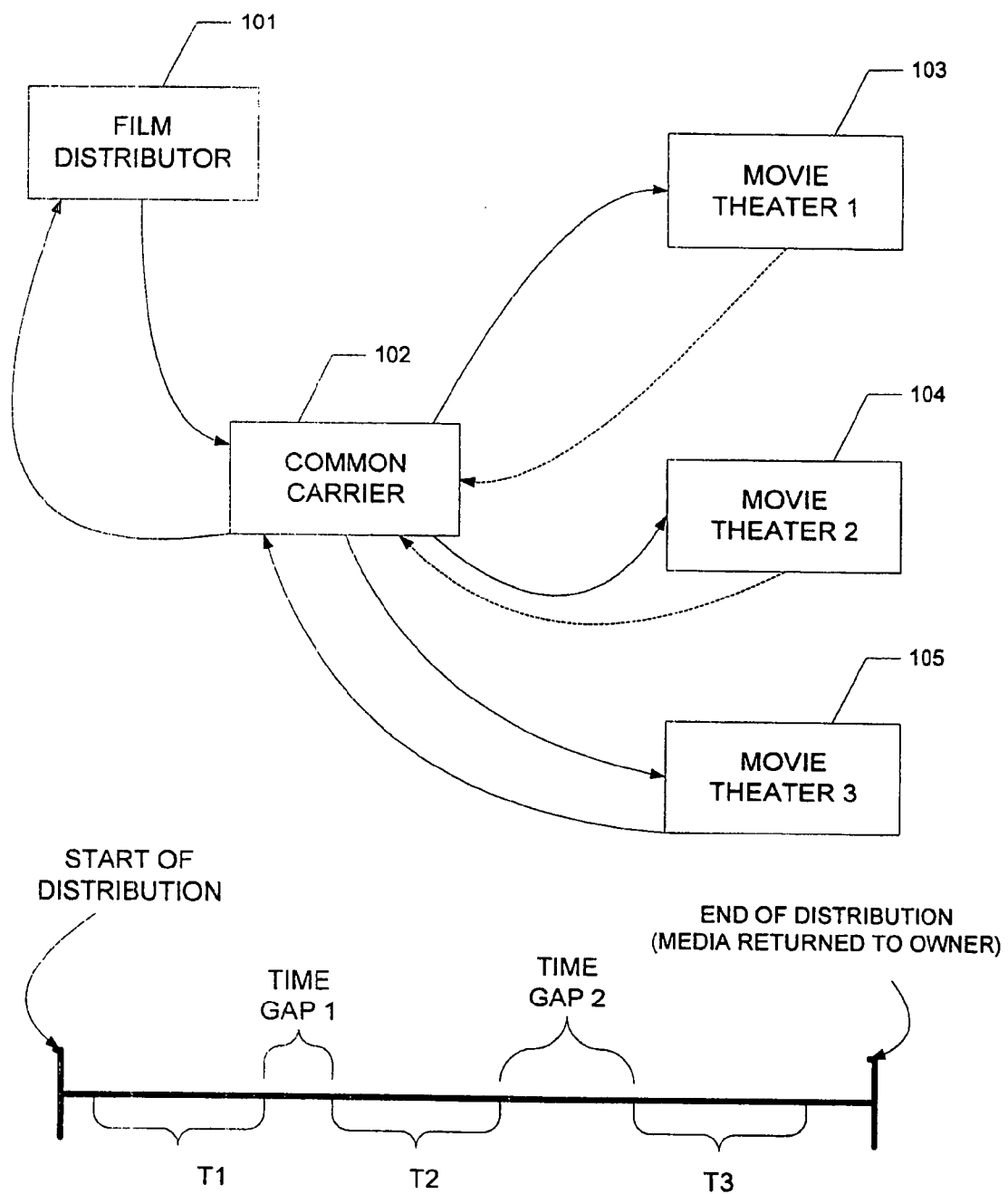
FIG. 1 is a block diagram showing an example of a distribution system for shipping media.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present invention. The figures do not describe every aspect of the present invention and do not limit the scope of the invention.

DETAILED DESCRIPTION OF THE PREFERRED EMBODIMENTS

The following serves as a glossary of terms as used herein:
GPS—global positioning system.
GSM—global system for remote communications.
RFID—radio frequency identification device.
Tamper box—a box, which when opened or tampered with, performs some action to indicate that the box has been opened or tampered with.

FIG. 1 is a block diagram showing an example of a distribution system for shipping media. A film distributor 101 owns a film that it wants to distribute to movie theaters 103-105. In this example, the movie theaters 103-105 have an agreement with the film distributor 101 in which they pay a fee in exchange for having the right to show the film theaters. Typically, such an agreement will state that the movie theater will have physical possession of the film reel at a specified time interval so that they can playback the film in the theater. In the timeline shown at the bottom of FIG. 1, movie theater 1 (103) has access to the film during time interval T1, movie theater 2 (104) has access to the film during time interval T2, and movie theater 3 (105) has access to the film during time interval T3.

The film is delivered from the film distributor to the movie theaters 103-105 by way of a common carrier 102 such as DHL or Federal Express. Common carriers typically provide tracking services so that the sender and receiver of a package can track the package during shipment. This tracking, however, is typically limited to providing information about the various common carrier sites that the package passes through on its way to the destination, and to providing information that the package has been delivered to its final destination. The movements of the package itself as it is moved from onto and off of the truck are not tracked.

A problem has developed in the film distribution industry where a canister containing a film reel is taken off the common carrier truck, copied illegally, and then placed back on the truck for delivery to its legitimate location. The illegal copies of the film are sold at a steep discount, thus depriving the film owner of revenue that he would have gained from his copyrighted film. This scenario can happen several times during the distribution of a particular film, and can be very costly for the film owner.

In the example shown in FIG. 1, the film is delivered to movie theater 1 which has purchased the rights to show the movie for time T1 (typically one week), then there is a time gap 1 during which it is presumed that the film canister is being delivered by the common carrier to movie theater 2 which has purchased the rights to show the movie for time T2. Then there is another time gap 2 during which it is presumed that the film canister is being delivered by the common carrier to movie theater 3 which has purchased the rights to show the movie for time T3. Time gap 1 and time gap 2 provide opportunities for copyright pirates to take the film canister away from the common carrier, for example by colluding with a truck driver to "borrow" the film and return it after copying it, or to simply steal it from the common carrier.

Another option for copyright pirates is to copy the film while it is legitimately located at a movie theater, during times T1, T2 and T3. This can happen as a result of the film canister being stolen from the theater or through cooperation of movie theater employees to enable the illegal copying of the film. Thus, what is needed is a system and method for distributing and tracking media that provides the film owner with a higher level of security and which detects and possibly prevents the behavior described above.

Figure 2:
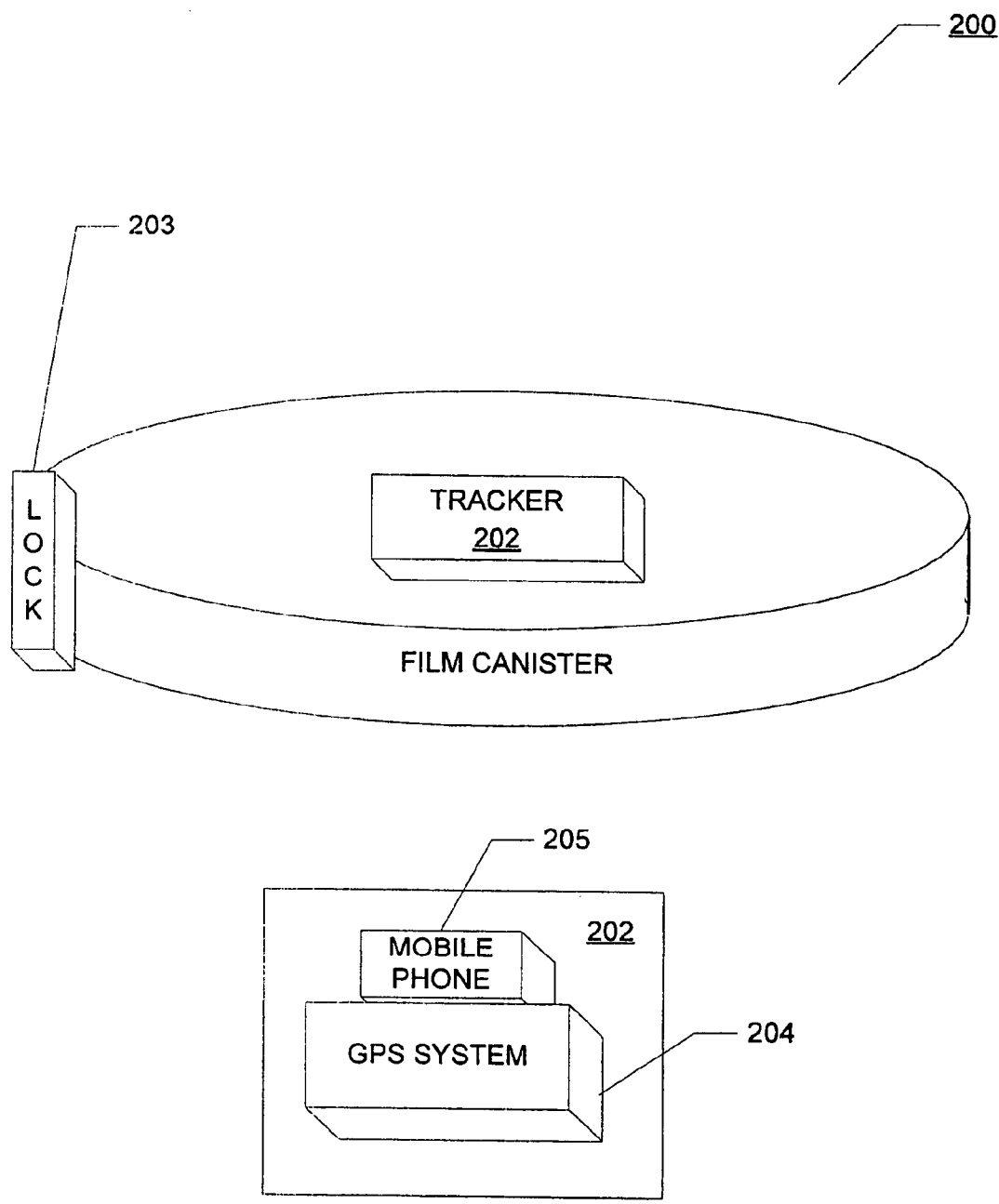
FIG. 2 is a diagram showing a perspective view of a tracking device package in accordance with an embodiment of the invention.

FIG. 2 is a diagram showing a perspective view of a tracking device package 200 in accordance with an embodiment of the invention. The film canister 201 contains a film reel (not shown) that is to be delivered to a destination. A lock 203 can be attached to the canister for purposes of preventing access to the film reel to someone who does not have permission, i.e. anyone not authorized to access the film reel inside. A tracker 202 is attached to the film canister or to the film reel itself. The tracker 202 provides a means for sending information about the specific location of the item to which it is attached. The tracker 202 can be turned on at all times for purposes of constantly tracking the film's whereabouts. The tracker 202 could also be part of a film canister that is implemented as a tamper box.

The opening of the tamper box triggers the tracker 202 to report information about the film's location in response to the tamper box being opened. In an embodiment of the present invention, the tracker can be a GPS device 204 combined with a mobile phone 205 that "phones home" or calls the owner of the film at an appropriate time to indicate that a particular event has occurred. For example, the tracker 202 can respond to the film reel being removed from the film canister 201 by detecting the location at the time of removal using the GPS, and then automatically placing a mobile phone call to the owner to report the opening of the canister. The mobile phone can be programmed to call a central repository or server 602 that is coupled to a database 601 that keeps track of all activity of such tracking device packages 200.

For example, the mobile phone can be programmed to "phone home" to the server 602 if the canister is opened or if the tracking device determines that the canister has been delivered to a destination that is outside of the boundaries of some predetermined travel path. This would be useful if the canister is taken to a destination that is outside of the normal delivery route for purposes of illegitimately copying the media and then returning the media to its regular delivery route. The central repository 602 and database 601 are described below in the discussion of FIG. 6. Other forms of tracking may be used to detect the location of the media, for example, RFID and GSM triangulation. For example, an RFID could be coupled to the film reel.

Figure 3:
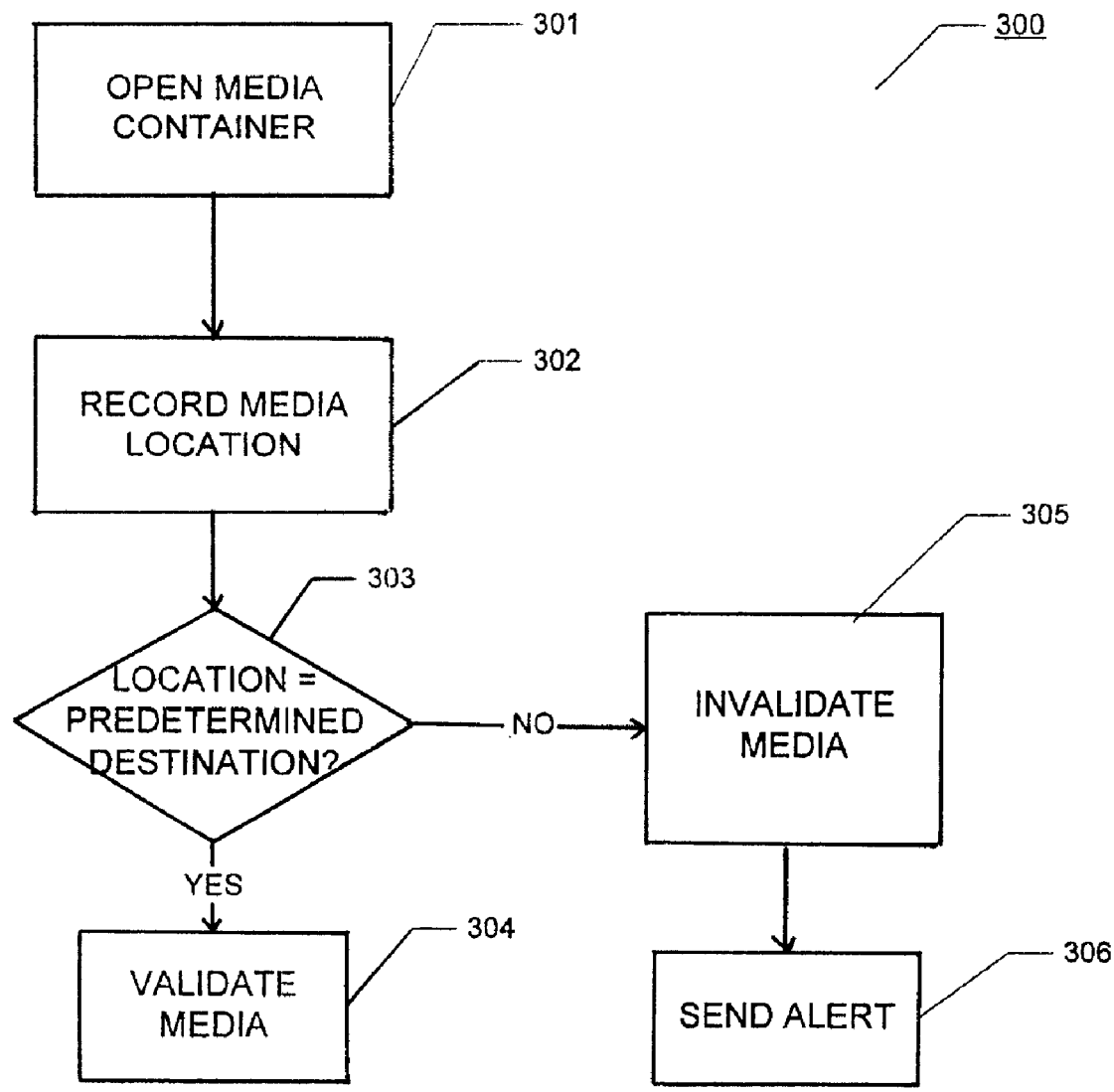
FIG. 3 is a flow diagram showing a method for distributing and tracking media in accordance with an embodiment of the invention.

FIG. 3 is a flow diagram 300 showing a method for distributing and tracking media in accordance with an embodiment of the invention. When a media container is opened, step 301, the location of the media is recorded, step 302. If the recorded location of the media corresponds to a predetermined destination, step 303, then the media is validated, step 304. For example, if the media's predetermined location is movie theater 1 and upon opening the media container, it is determined that the media container is located at movie theater 1, then the media is validated. If the recorded location of the media does not correspond to a predetermined destination, step 303, then the media is invalidated, step 305 and an alert signal is sent to the owner of the media, step 306. For example, if a film reel is authorized to be located at movie theater 1, but the recorded location shows that it is physically located in another city, then the media location is invalid.

Figure 4:
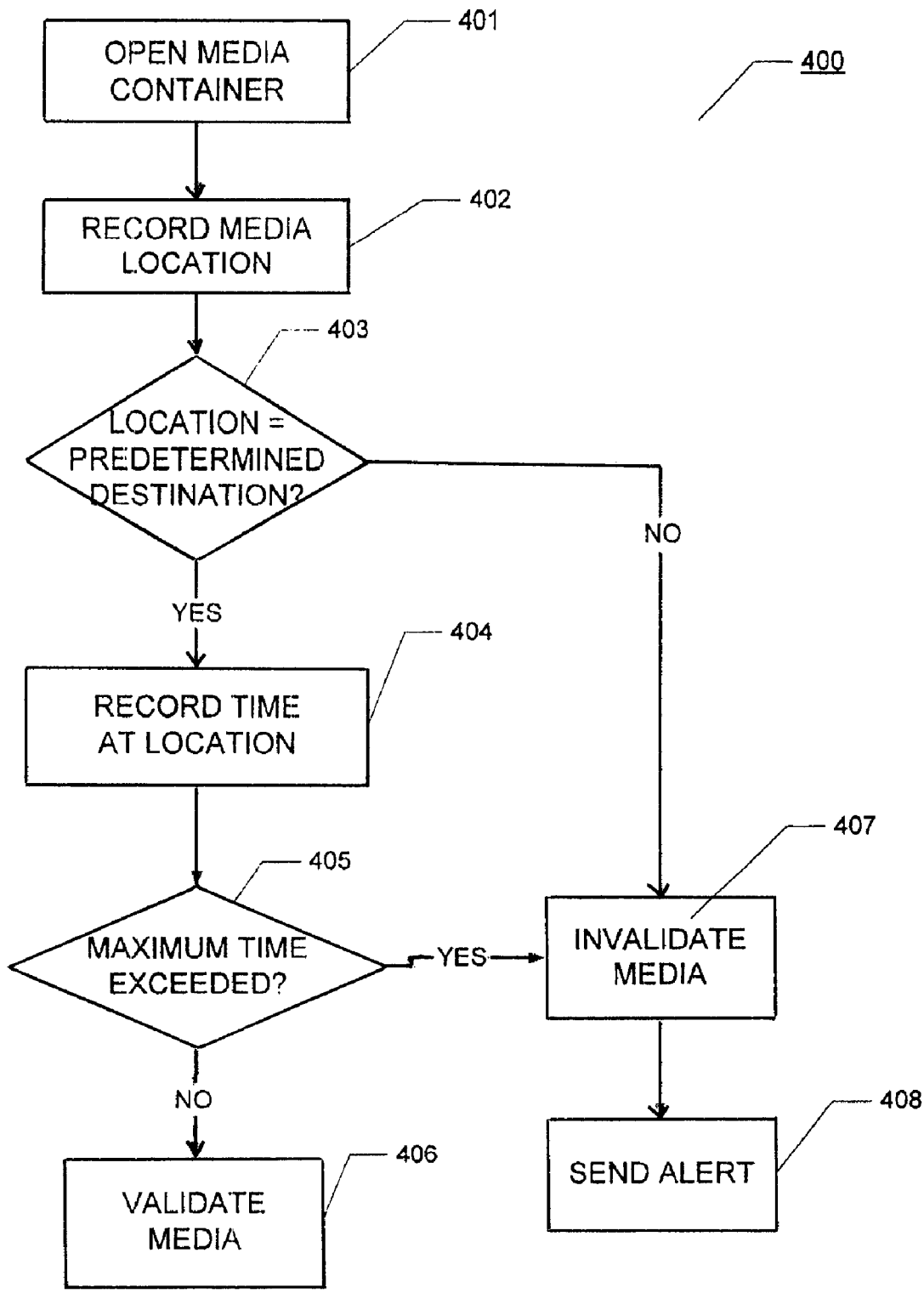
FIG. 4 is a flow diagram showing a method for distributing and tracking media in accordance with an embodiment of the present invention.

FIG. 4 is a flow diagram 400 showing a method for distributing and tracking media in accordance with an embodiment of the present invention. When a media container is opened, step 401, the location of the media is recorded, step 402. If the recorded location of the media corresponds to a predetermined destination, step 403, then the media is assumed valid up to this point. In an embodiment of the invention, an automatic locking device can unlock the media container automatically when the predetermined location is reached. Alternatively, an encryption key can be used to unlock the media container in response to an input such as a predetermined code.

A release/enabling key can be used to unlock the media container if certain predetermined criteria are met. For example, if the media container is located within a certain distance of a predetermined destination, the release/enabling key will allow the media canister to be opened. Also, in an embodiment of the invention, a master override key can be implemented as a backup method of opening the canister in case any other keys or locking devices do not work to open the media container. Such a master override key should be closely guarded for security purposes.

The time that the media has been at the location is then recorded, step 404. The recorded time is compared to a maximum time that the media is allowed to remain at the location, step 405. For example, the maximum can be the maximum length of time that movie theater 1 can retain physical possession of the media at that location. (This is typically based on the contract between the movie theater and the copyright owner with respect to the length of time that the movie theater retains playback rights to the media.)

For purposes of this example, the maximum time is shown on FIG. 1 as T1. If the recorded time at the location exceeds the maximum time, then the media is invalidated, step 407, and an alert is sent to the copyright owner, step 408. If the maximum time has not been exceeded, then the media is validated for playback, step 406.

Figure 5:
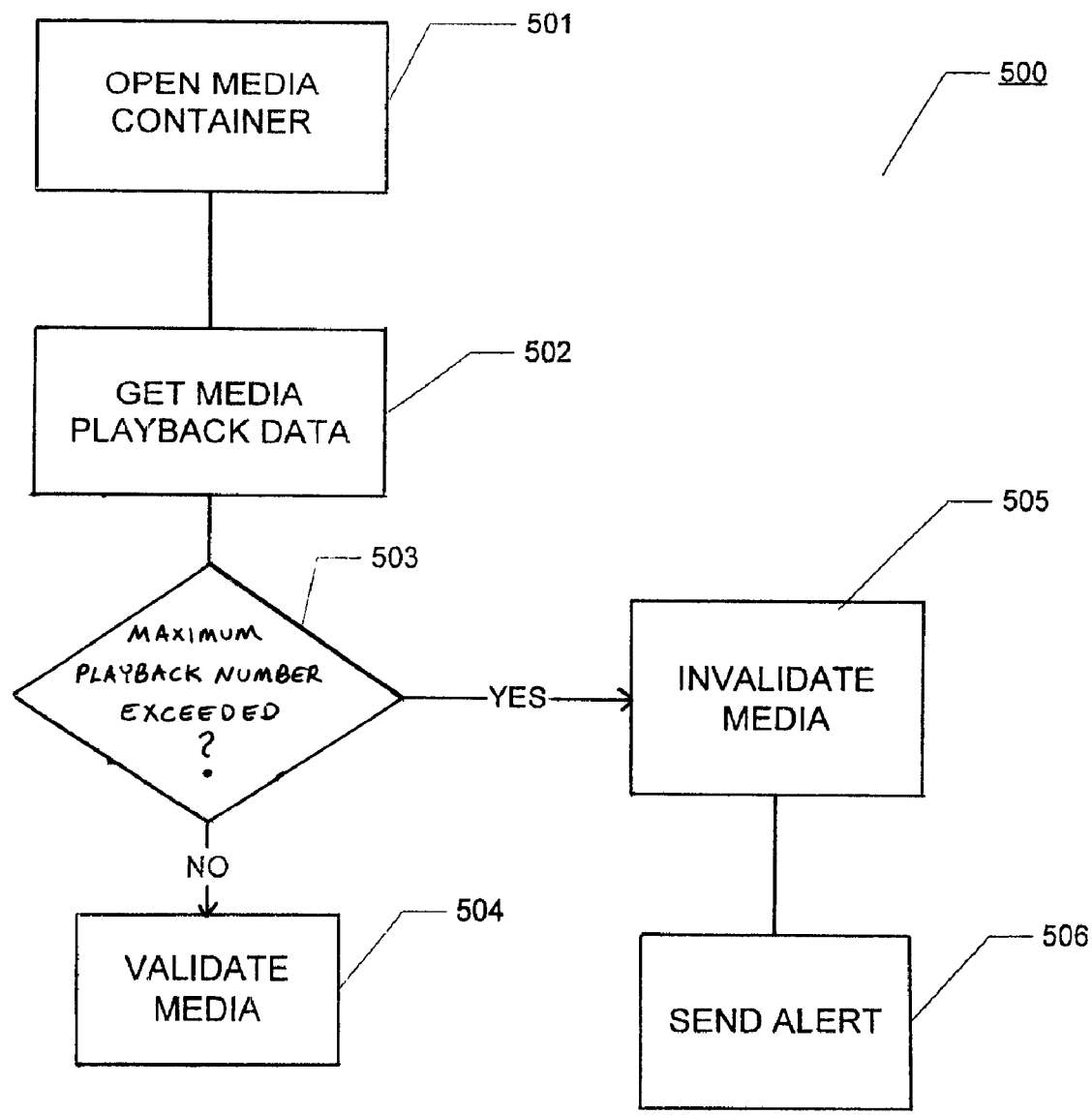
FIG. 5 is a flow diagram showing a method for distributing and tracking media in accordance with an embodiment of the present invention.

FIG. 5 is a flow diagram 500 showing a method for distributing and tracking media in accordance with an embodiment of the present invention. When a media container is opened, step 501, playback data associated with the media is recorded, step 502. The playback data includes information such as the number of times the media has been played back. The number of times that the media has been played back is compared to a maximum playback number, step 503. In an embodiment of the invention, the playback time can be tracked by using an accelerometer which tracks the spinning of a media reel such as a film reel. The accelerometer tracks how many times the reel has spun around its axis, and can be used to provide usage statistics, based on the assumption that if the reel is spinning, the film is being shown or rewound for another use.

If the accelerometer detects that the film is being used for a significantly longer time than is expected, based on the agreement between the film owner and the movie theaters that have a license to show the film a specific number of times, then it can be assumed that there is a possibility that the film is being used outside of the scope of the license. This could used to detect the scenario where a copyright infringer takes the film reel between legitimate showings, makes a copy of it and then returns it to the movie theater. If the number of times that the media has been played back does not exceed the maximum playback number, then the media is validated, step 504. If the number of times that the media has been played back exceeds the maximum playback number, then the media is invalidated, step 505, and an alert signal is sent to the owner of the media, step 506.

Figure 6:
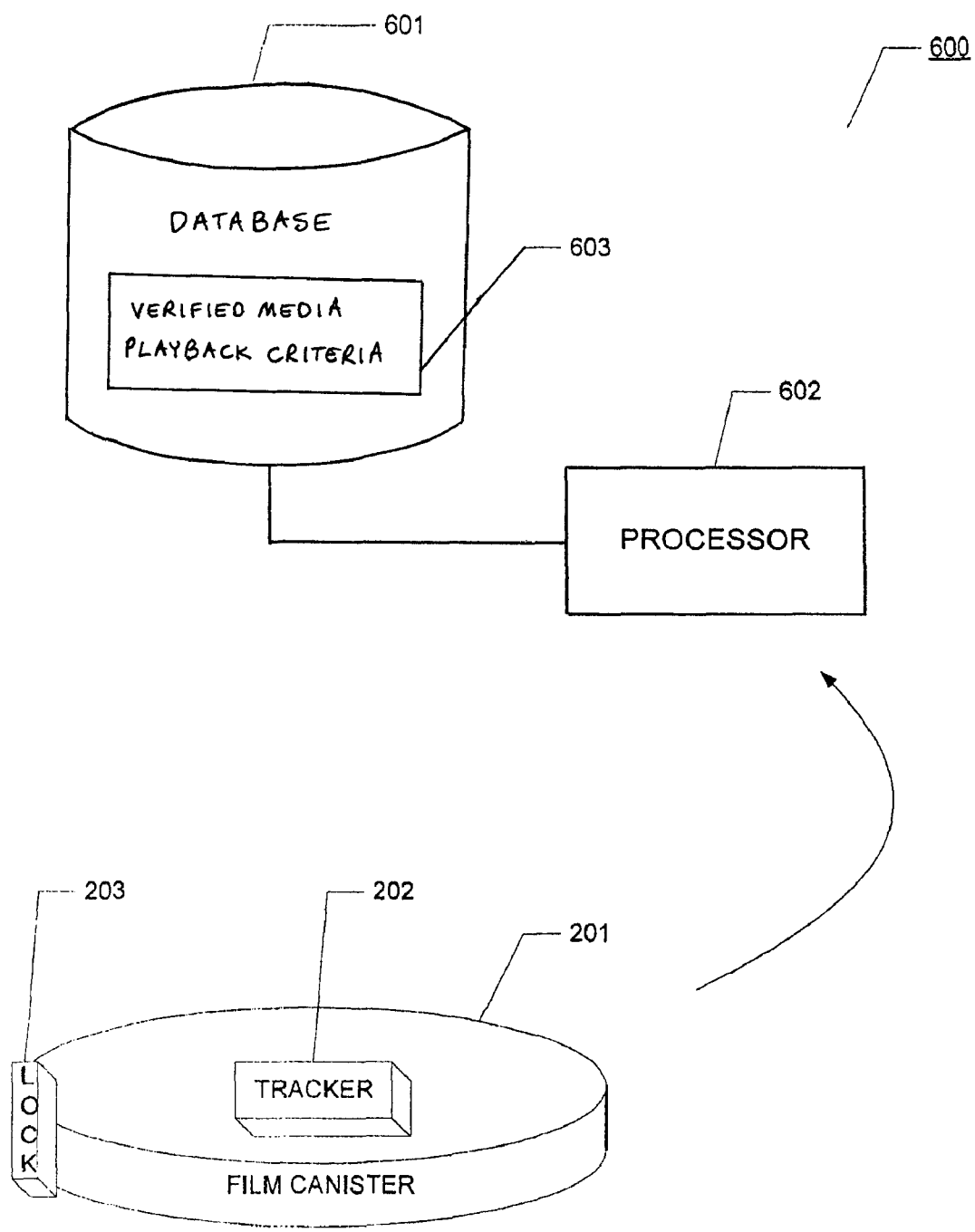
FIG. 6 is a block diagram showing a system for distributing and tracking media in accordance with an embodiment of the present invention.

FIG. 6 is a block diagram showing a system for distributing and tracking media in accordance with an embodiment of the present invention. A database 601 includes various representations of verified media playback 603 associated with a mobile tracking device 202 coupled to a media container 201. The database 601 is coupled to a processor 602. The processor 601 is a central repository or server that communicates with the database 601 and the mobile tracking device 202. The mobile tracking device 202 communicates with processor 602 as shown so that information obtained by the mobile tracking device 202 can be compared to the verified media playback criteria 603 contained in database 601.

The foregoing described embodiments of the invention are provided as illustrations and descriptions. They are not intended to limit the invention to the particular forms or methods disclosed, but, to the contrary, the invention is to cover all modifications, equivalents, and alternatives. In particular, it is contemplated that functional implementations of the invention described herein may be implemented equivalently in hardware, software, firmware, and/or other available functional components or building blocks, and that networks may be wired, wireless, or a combination of wired and wireless. Other variations and embodiments are possible in light of the above teachings. This, it is intended that the scope of invention is not limited by this Detailed Description, but rather by the following claims.

What is claimed is:

1. A system for tracking media, comprising:
a portable tracking system being associated with a shipping container for the media, and wirelessly transmitting status information representing a status of the media; and
a central media validation system receiving said status information transmitted by said portable tracking system and comparing said status information with a predetermined media verification criterion,
wherein said media validation system validates the media for playback if said status information complies with said predetermined media verification criterion and invalidates the media, inhibiting playback of the media, if said status information deviates from said predetermined media verification criterion,
wherein said portable tracking system is attached to the media,
wherein said predetermined media verification criterion comprises at least one preselected authorized movie theater for the media at a preselected authorized time and for a preselected authorized time interval.

2. The system of claim 1, wherein said portable tracking system constantly tracks the status of the media.

3. The system of claim 2, wherein said portable tracking system constantly transmits said status information.

4. The system of claim 1, wherein said portable tracking system transmits said status information when said shipping container is opened.

5. The system of claim 1, wherein said shipping container includes a locking system to prevent unauthorized access to the media.

6. The system of claim 5, wherein said media validation system transmits an unlock signal to said locking system if said status information complies with said predetermined media verification criterion, and wherein said locking system receives said unlock signal and permits access to the media in response to said unlock signal.

7. The system of claim 5, wherein said locking system permits access to the media in response to entry of at least one of an encryption key, a release key, an enabling key, a predetermined code, and a master override key.

8. The system of claim 1, wherein said portable tracking system transmits said status information via a mobile telephone system.

9. The system of claim 1, wherein said portable tracking system comprises a media location system that provides location data representing a geographical location of the media, said status information including said location data.

10. The system of claim 9, wherein said media location system is selected from the group consisting of a global positioning system, a radio frequency identification system, and a global system for remote communications.

11. The system of claim 9, wherein said media validation system validates the media for playback by comparing said location data with a predetermined authorized geographical location for the media.

12. The system of claim 11, wherein said media validation system validates the media for playback by monitoring a time interval during which the media remains at said predetermined authorized geographical location.

13. The system of claim 1, wherein said portable tracking system includes a media usage system that provides usage data representing a number of times that the media has been played back, said status information including said usage data.

14. The system of claim 13, wherein said media usage system comprises an accelerometer.

15. The system of claim 13, wherein said media validation system validates the media for playback by comparing said usage data with a predetermined number of playback times for which the media is authorized for playback.

16. The system of claim 1, wherein said media validation system includes a database system for storing said predetermined media verification criterion.

17. The system of claim 1, wherein said predetermined media verification criterion includes a travel route that comprises a time sequence of preselected authorized geographical locations.

18. The system of claim 17, wherein said travel route includes a preselected time interval during which the media is authorized to remain at each of said preselected authorized geographical locations.

19. The system of claim 17, wherein said travel route includes a preselected number of playback times for which the media is authorized for playback at each of said preselected authorized geographical locations.

20. The system of claim 1, wherein said media validation system contacts an owner of the media if said status information deviates from said predetermined media verification criterion.

21. A shipping container device for media, comprising:
a container body defining a cavity that receives the media; and
a portable tracking system being associated with said container body and wirelessly transmitting status information representing a status of the media to a central media validation system,
wherein the central media validation system validates the media for playback if said status information complies with a predetermined media verification criterion and invalidates the media, inhibiting playback of the media, if said status information deviates from said predetermined media verification criterion, wherein said portable tracking system is attached to the media, wherein said predetermined media verification criterion comprises at least one preselected authorized movie theater for the media at a preselected authorized time and for a preselected authorized time interval.

22. The shipping container device of claim 21, wherein said portable tracking system transmits said status information when the shipping container device is opened.

23. The shipping container device of claim 21, further comprising a locking system to prevent unauthorized access to the media.

24. The shipping container device of claim 23, wherein said locking system receives an unlock signal from the media validation system and permits access to the media in response to said unlock signal, the media validation system transmitting the unlock signal to said locking system if said status information complies with said predetermined media verification criterion.

25. The shipping container device of claim 23, wherein said locking system permits access to the media in response to entry of at least one of an encryption key, a release key, an enabling key, a predetermined code, and a master override key.

26. The shipping container device of claim 21, wherein said portable tracking system comprises a media location system that provides location data representing a geographical location of the media, wherein said status information includes said location data, and wherein the media validation system validates the media for playback by comparing said location data with a predetermined authorized geographical location for the media.

27. The shipping container device of claim 21, wherein said portable tracking system includes a media usage system that provides usage data representing a number of times that the media has been played back, wherein said status information includes said usage data, and wherein the media validation system validates the media for playback by comparing said usage data with a predetermined number of playback times for which the media is authorized for playback.

28. A method for tracking media, comprising:
wirelessly transmitting status information representing a status of the media via a portable tracking system coupled to the media; and
at a central media validation system,
receiving said status information transmitted by said portable tracking system at a central media validation system;
comparing said status information with a predetermined media verification criterion;
validating the media for playback if said status information complies with said predetermined media verification criterion; and
if said status information deviates from said predetermined media verification criterion,
invalidating the media; and
inhibiting playback of the media,
wherein said predetermined media verification criterion comprises at least one preselected authorized movie theater for the media at a preselected authorized time and for a preselected authorized time interval.

29. The method of claim 28, further comprising constantly tracking the status of the media.

30. The method of claim 28, wherein said wirelessly transmitting said status information comprises constantly transmitting said status information.

31. The method of claim 28, further comprising providing a shipping container for the media.

32. The method of claim 31, wherein said wirelessly transmitting said status information includes transmitting said status information when said shipping container is opened.

33. The method of claim 31, further comprising disposing a locking system on said shipping container to prevent unauthorized access to the media.

34. The method of claim 33, further comprising transmitting an unlock signal from said media validation system to said locking system if said status information complies with said predetermined media verification criterion, said locking system permitting access to the media in response to said unlock signal.

35. The method of claim 33, further comprising permitting access to the media in response to entry into said locking system of at least one of an encryption key, a release key, an enabling key, a predetermined code, and a master override key.

36. The method of claim 28, wherein said wirelessly transmitting said status information includes transmitting location data representing a geographical location of the media.

37. The method of claim 36, wherein said validating the media for playback includes comparing said location data with a predetermined authorized geographical location for the media.

38. The method of claim 36, wherein said validating the media for playback includes monitoring a time interval during which the media remains at a predetermined authorized geographical location.

39. The method of claim 28, wherein said wirelessly transmitting said status information includes transmitting usage data representing a number of times that the media has been played back, and wherein said validating the media for playback includes comparing said usage data with a predetermined number of playback times for which the media is authorized for playback.

40. The method of claim 28, further comprising contacting an owner of the media if said status information deviates from said predetermined media verification criterion.

* * * * *